(12) United States Patent
Morio et al.

(10) Patent No.: US 7,200,290 B2
(45) Date of Patent: Apr. 3, 2007

(54) OPTICAL SWITCH

(75) Inventors: Wada Morio, Tokyo (JP); Araki Shoujirou, Tokyo (JP); Dobashi Machio, Tokyo (JP); Iio Shinji, Tokyo (JP); Suehiro Masayuki, Tokyo (JP); Asano Yoshiyuki, Tokyo (JP); Nakajima Shinichi, Tokyo (JP); Yakihara Tsuyoshi, Tokyo (JP); Miura Akira, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 11/144,487

(22) Filed: Jun. 2, 2005

(65) Prior Publication Data

US 2006/0013522 A1 Jan. 19, 2006

(30) Foreign Application Priority Data

Jun. 4, 2004 (JP) ............... P.2004-167325

(51) Int. Cl.
*G02F 1/295* (2006.01)
*G02B 6/10* (2006.01)
*G02B 6/26* (2006.01)

(52) U.S. Cl. ............ 385/9; 385/4; 385/8; 385/14; 385/15; 385/16; 385/40; 385/41; 385/131; 385/132; 385/130

(58) Field of Classification Search .............. 385/14, 385/40, 42, 15, 16, 17, 18, 24, 129, 130, 385/131
See application file for complete search history.

(56) References Cited

U.S. PATENT DOCUMENTS 4,840,446 A * 6/1989 Nakamura et al. ......... 385/131
4,987,468 A * 1/1991 Thornton ................... 257/198
5,422,967 A * 6/1995 Inoue et al. ................. 385/16
6,294,794 B1 * 9/2001 Yoshimura et al. .......... 257/14
6,633,692 B2 * 10/2003 Chua et al. .................. 385/16
6,836,351 B2 * 12/2004 Livingston et al. ......... 359/279
2004/0056243 A1 * 3/2004 Atanackovic et al. ........ 257/19
2006/0013522 A1 * 1/2006 Morio et al. .................. 385/4

OTHER PUBLICATIONS

Li, et al., "1.55 μm Reflection-type optical waveguide switch based on SiGe/Si Plasma Dispersion Effect," Applied Physics Letters, 75:1-3 (1999).
"Optical Integrated Circuit—Fundamentals and Applications," (1988).
Li, et al., "2×2 Optical Waveguide Switch with Bow-Tie Electrode Based on Carrier-Injection Total Internal Reflection in SiGe Alloy," IEEE Photonics Technology Letters, 13:206-208 (2001).

(Continued)

*Primary Examiner*—Brian M. Healy
(74) *Attorney, Agent, or Firm*—John J. Penny, Jr.; Edwards Angell Palmer & Dodge LLP

(57) ABSTRACT

An optical switch has an optical waveguide whose output path of an optical signal branches into two, a carrier injection section which is provided to a branch portion of the optical waveguide and to which carriers are injected, and a refractive index change section which is provided to a optical waveguide layer of the optical waveguide and in which a refractive index changes in a case that carrier are injected to the carrier injection section, wherein the refractive index change section has a quantum dot or a quantum wire.

7 Claims, 7 Drawing Sheets

OTHER PUBLICATIONS

Inoue, et al., "An 8mm Length Nonblocking 4×4 Optical Switch Array," IEEE Journal on Selected Areas in Communications, 6:1262-1265 (1988).

Ishida, et al., "InGaAsP/InP Optical Switches Using Carrier Induced Refractive Index Change," Appl. Phys. Lett., 50:141-142 (1987).

* cited by examiner

OPTICAL SWITCH

CROSS-REFERENCE TO RELATED APPLICATIONS

This application is based upon and claims the benefit of priority from the prior Japanese Patent Applications No. 2004-167325, filed on Jun. 4, 2004, the entire contents of which are incorporated herein by reference.

BACKGROUND OF THE INVENTION

1. Field of the Invention

The present invention relates to an optical switch having an optical waveguide whose output path of an optical signal branches into two, in which an output path for outputting the optical signal is switched according to a refractive index change caused by injecting carrier at a branching portion of the optical waveguide. More particularly, the invention relates to a semiconductor optical switch of the optical waveguide type enabled to highly increase an optical response speed.

2. Description of the Related Art

Current communication networks, such as LAN (Local Area Network) and WAN (Wide Area Network), usually employ communication systems, which transmit information through electrical signals.

Communication methods, which transmit information through optical signals, are employed only in trunk networks, which transmit large quantities of data, and in some other networks. Incidentally, these networks use "point-to-point" communication. Under the current situation, these networks have not developed to the level of a communication network, which is what is called a "photonic network".

Realizing such a "photonic network" requires devices, such as an "optical router" and an "optical switching hub", which have functions similar to those of a router and a switching hub that are used for switching the destinations of electrical signals. Also, measuring apparatuses for optical communication, which perform measurements of these devices, are required.

Further, such apparatuses (an optical system and the measuring apparatuses for optical communication) require optical switches each for switching a transmission path at a high speed. Hereinafter, a description is given of a conventional optical switch for switching the transmission path of an optical signal by forming an optical waveguide in a semiconductor and by providing a current injection region therein and by injecting an electric current (carriers) into the semiconductor to thereby change the refractive index of the region.

FIGS. 3 and 4 are a plan view and a cross-sectional view, respectively, showing an example of the conventional optical switch (See, for example, Document (1) referred to below.). As shown in FIG. 3, an "X-shaped" optical waveguide 2 is formed in a substrate 1. An electrode 3 is formed at an intersecting portion of the "X-shaped" optical waveguide 2. An electrode 4 is formed in the vicinity of the intersecting portion of the "X-shaped" optical waveguide 2 in parallel with the electrode 3.

Meanwhile, FIG. 4 is a cross-sectional view taken along line "A–A'" shown in FIG. 3. A substrate 5 shown in FIG. 4 is made of p-Si or the like. A core layer 6 is a p-SiGe layer and formed on the substrate 5. Further, most of incident light is waveguided and propagated in this core layer 6. Further, the "X-shaped" optical waveguide 2 is formed in the core layer 6. An $n^+$-region 7 for a contact is formed in the intersecting portion of the optical waveguide 2. A $p^+$-region 8 for a contact is formed in the vicinity of the intersecting portion.

An insulating film 11 is made of $SiO_2$ or the like and formed on a part of the core layer 6, which is other than the $n^+$-region 7 and the $p^+$-region 8. An n-electrode 9 is formed on the $n^+$-region 7. A p-electrode 10 is formed on the $p^+$-region B.

Next, an operation of the example of the conventional optical switch shown in FIGS. 3 and 4 is described hereinbelow.

In a case where the optical switch is in "OFF"-state, no electric current is supplied to the electrode 3 (or the electrode 9) and the electrode 4 (or the electrode 10). Thus, change in the refractive index of the intersecting portion of the "X-shaped" optical waveguide 2 shown in FIG. 3 does not occur. Consequently, for example, an optical signal having been incident from an incident end designated by "PI01" in FIG. 3 goes straight through the intersecting portion and is outputted from an output end designated by "PO01" in FIG. 3.

Conversely, in a case where the optical switch is in "ON" state, electric current flows from the p-electrode 10 to the n-electrode 9 through the $n^+$-region 7. That is, electrons are injected from the electrode 3 (or the electrode 9), while hole are injected from the electrode 4 (or the electrode 10). Thus, carriers (electrons and holes) are injected into the intersecting portion. Consequently, the carrier density of a part of the optical waveguide, which is located near to the $n^+$-region 7, is increased.

This increase in the carrier density results in reduction in the refractive index of the intersecting portion of the "X-shaped" optical waveguide 2 shown in FIG. 3. For instance, an optical signal having been incident from the incident end designated by "PI01" shown in FIG. 3 is totally reflected at the boundary between a low-refractive-index region (that is, the region located near to the $n^+$-region 7 in the optical waveguide 2), which is produced in the intersecting portion, and a region (the remaining half of the region in the optical waveguide 2), of which the refractive index hardly changes, and then outputted from an output end designated by "PO02" in FIG. 3.

Consequently, the refractive index of the intersecting portion is controlled by supplying electric current to the electrode to thereby inject carriers (electrons and holes) into the intersecting portion of the optical waveguide 2. Thus, a position, from which an optical signal is outputted, can be controlled. In other words, the transmission path, through which an optical signal is propagated, can be switched.

Therefore, a light reflection region can efficiently be produced by clearly defining the boundary between the region, in which the carrier density is increased and the refractive index change is caused by injecting an electric current thereinto, and the region, in which the refractive index change does not occur, in the optical waveguide 2 to thereby enable occurrences of light reflection thereat.

Additionally, a principle on the basis of the change of the refractive index that results from the shift of the wavelength of a light absorbing end in the inter-band transition of a semiconductor material (a band filling effect) (See, for example, Document (2) referred to below) or the refractive index change due to the carrier density is caused on the basis of a plasma dispersion effect (See, for example, Document (3) referred to below.). Thus, in a case where the carrier densities of two optical waveguides are equal to each other, the change in the refractive index of one of the two optical waveguides, which is smaller in the effective mass of carriers (that is, free electrons and free holes) than the other optical waveguide, is larger than that in the refractive index of the other optical waveguide. Thus, large change in the refractive index is caused at a smaller amount of injected electric current (that is, at a lower current density) by using a material system, which is small in the effective mass of carriers. Consequently, a low-current-driven optical switch can be realized.

Referring next to FIG. 5, there is shown an example (See, for example, Document (4) referred to below.) of a cross-sectional view of a conventional optical switch using a material system, which is small in the effective mass of carriers (free electrons and free holes).

A substrate 12 shown in FIG. 5 is made of InP or the like. A core layer 13 is constituted by, for instance, an n-InGaAsP four-element layer and formed on the substrate 12. An n-InP layer 14 is formed on the core layer 13. An n-InGaAsP layer 15 is formed on the n-InP layer 14. An insulating film 16 is made of $SiO_2$ or the like and formed on the n-InGaAsP layer 15. A p-electrode 17 is formed on the insulating film 16. An n-electrode 18 is formed on the back surface of the substrate 12.

The optical switch shown in FIG. 5 is configured so that the core layer 13, the InP layer 14, and the InGaAsP layer 15 are serially formed in this order on the substrate 12, and that an "X-shaped" optical waveguide is formed by etching down to the core layer 13.

Further, p-type impurities are diffused in a portion designated by "DR11" in FIG. 5. Then, an electrode 17 is formed in such a way as to be in contact with the portion designated by "DR11" in FIG. 5. An electrode 18 is formed on the back surface of the substrate 12.

According to the example of the conventional optical switch shown in FIG. 5, larger change in the refractive index is obtained at a lower current injection amount (or at a lower current density) by using a material system, which is small in the effective mass of carriers (free electrons and free holes). Consequently, a low-current-driven optical switch can be realized.

Next, a description is given of an optical switch constituted in such a way as to limit a refractive index change region by current confinement. FIGS. 6 and 7 are a plan view and a cross-sectional view illustrating an example of the conventional optical switch, in which a p-type region is provided in the intersecting portion of the optical waveguides thereby to perform current confinement, to confine a high-carrier-density region, and to limit the refractive index change region (See, for example, Document (5) referred to below.).

As shown in FIG. 6, an "X-shaped" optical waveguide 20 is formed in a semiconductor substrate 19. An electrode 21 is formed at the intersecting portion of the "X-shaped" optical waveguide 20.

Meanwhile, FIG. 7 is a cross-sectional view taken along line "B–B'" shown in FIG. 6. A substrate 22 shown in FIG. 7 is made of, for instance, InP. A lower clad layer 23 is made of, for example, an n-InP layer and formed on the substrate 22. A core layer 24 is an n-InGaAsP layer and formed on the lower clad layer 23. A contact layer 26 is an n-InGaAsP layer and formed on the upper clad layer 25.

In portions designated by "DR31" to "DR33" in FIG. 7, Zn, which is p-type impurity, is diffused. Oxide film 27 is made of $SiO_2$ or the like and formed on a part of the contact layer 26, which is other than the diffusion region designated by "DR33" in FIG. 7. A p-electrode 28 is formed on the diffusion region designated by "DR33" in FIG. 7. An n-electrode 29 is formed on the back surface of the substrate 22.

Hereunder, an operation of the conventional optical switch shown in FIGS. 6 and 7 is described. In a case where the optical switch is in "OFF"-state, no current is supplied to the electrode 21 (or the electrode 28) and to the electrode (not shown), which is formed on the back surface 19 (and corresponds to the electrode 29 shown in FIG. 7).

Thus, no change in the refractive index of the intersecting portion of the "X-shaped" optical waveguide 20 occurs. Therefore, for example, an optical signal having been incident from a portion designated by "PI21" in FIG. 6 goes straight in the intersecting portion and outputted from a portion designated by "PO21" in FIG. 6.

Meanwhile, in a case where the optical switch is in "ON"-state, currents are supplied to the electrode 21 (or the electrode 28) and an electrode (not shown), which is provided on the back surface of the substrate 19 (and corresponds to the electrode 29 shown in FIG. 7). Further, carriers (electrons and holes) are injected into the intersecting portion.

Thus, the refractive index of a portion located just under the electrode 21 provided at the intersecting portion of the "X-shaped" optical waveguide 20 is changed through the influence of a plasma effect in such a way as to become lower. Therefore, an optical signal having been incident from an end designated by "PI21" in FIG. 6 is totally reflected by the boundary between a low refractive portion, which is produced in the intersecting portion, and the remaining portion thereof and outputted from a portion designated by "PO22" in FIG. 6.

Consequently, the position from which an optical signal is outputted, in other words, a transmission path, through which the optical signal is propagated, can be switched by supplying electric current to the electrodes; so that carriers (electrons and holes) are injected into the intersecting portion of the "X-shaped" optical waveguide 20, thereby to control the refractive index of the intersecting portion.

The following documents (1) to (5) are referred to as related art.

(1) Baujun Li, Guozheng Liu, Zuimin Jiang, Chengwen Pei, and Xun Wang: "1.55 μm Reflection-Type Optical waveguide Switch Based on SiGe/Si Plasma Dispersion Effect", Appl. Phys. Lett., Vol. 75, No. 1, pp. 1–3, 1999.

(2) Applied Physics Society, Editor of Optical Social Meeting, "Optical Integrated Circuit -Basis and Application-", First Edition, Asakura Bookshop, Apr. 10, 1988, Chapter 5, p 104

(3) Baujun Li, and Soo-Jin Chua: "2×2 Optical Waveguide Switch with Bow-Tie Electrode Based on Carrier-Injection Total Internal Reflection in SiGe Alloy", IEEE Photon. Tech. Lett., Vol. 13, No. 3, pp. 206–208, 13 (2001).

(4) Hiroaki Inoue, Hitoshi Nakamura, Kenichi Morosawa, Yoshimitsu Sasaki, Toshio Katsuyama, and Naoki Chinone: "An 8 mm Length Nonblocking 4×4 Optical Switch Array", IEEE Journal on Selected Areas in Communications, Vol. 6, No. 7, pp. 1262–1266, 1988.

(5) K. Ishida, H. Nakamura, H. Matsumura, T. Kadoi, and H. Inoue: "InGaAsP/InP Optical Switches Using Carrier Induced Refractive Index Change", Appl. Phys. Lett., Vol. 50, No. 19, pp. 141–1442, 1987.

According to the example of the conventional optical switch described above, light reflection is caused by the boundary between a region, in which a carrier density is increased by current injection (or carrier injection) to thereby cause change in the refractive index thereof (or reduce the refractive index thereof), and a region, in which no change in the refractive index thereof occurs, thereby to perform optical switching and to switch the transmission path of an optical signal.

Therefore, the conventional optical switch operates according to a principle based on the refractive index change due to a plasma dispersion effect (See Document (3)) or according to a principle based on a refractive index change (due to a band filling effect), which arises from shift of the optical absorption edge wavelength at an interband transition of a semiconductor material (see Document (2)).

However, the optical response speed of the optical switch for optically switching the transmission path of an optical signal according to a charier density change is restricted by a carrier life. Therefore, the optical response speed is also determined by the carrier life that depends upon the semiconductor material and the structure of a current injection region, that is, a refractive index change region of the optical switch. For example, the optical response speed of the conventional optical switch is several tens nanoseconds to several hundreds nanoseconds due to the carrier life when the injection of a drive current is stopped. Thus, the optical response speed of the conventional optical switch is low.

SUMMARY OF THE INVENTION

The object of the invention is to provide an optical switch of the optical waveguide type which enables to highly increase an optical response speed.

The invention provides an optical switch, having: an optical waveguide whose output path of an optical signal branches into two; a carrier injection section which is provided to a branch portion of the optical waveguide and to which carriers are injected; and a refractive index change section which is provided to a optical waveguide layer of the optical waveguide and in which a refractive index changes in a case that carrier are injected to the carrier injection section, wherein the refractive index change section has a quantum dot or a quantum wire.

In the optical switch, the optical waveguide layer is a region where light propagating through the optical waveguide is confined, and includes a core layer.

In the optical switch, the optical waveguide is a slab optical waveguide.

In the optical switch, the quantum dot or the quantum wire is provided in the core layer.

In the optical switch, a wavelength selection filter which eliminates light generated by luminescent recombination, which is caused when carrier are annihilated in the quantum dot or the quantum wire.

In the optical switch, the optical waveguide has a shape that two straight optical waveguides intersect with each other.

In the optical switch, the optical waveguide has a shape that one straight optical waveguide branches off at different angles.

According to the optical switch, since the quantum dot or the quantum wire, whose band gap is narrow, is provided in the refractive index change section, the life of carriers can be shortened by luminescent carrier recombination that is caused by the quantum dot or the quantum wire. Consequently, the optical response speed of the optical switch can be highly increased.

Moreover, since the optical switch is constructed only by inserting the quantum dot or the quantum wire into the optical switch of the carrier-injection optical-wavelength type, the optical switch, whose optical response speed is highly increased, can easily be manufactured by using a conventional manufacturing process. Therefore, the practical value of the optical switch is very high.

In the case that the wavelength of light generated by luminescent recombination, which is caused when carriers are annihilated in the quantum dot or the quantum wire, can be set to a luminescence wavelength that differs from wavelengths used for optical communication according to the size of the quantum dot or the quantum wire, the increase in amount of optical absorption caused by inserting the quantum dot or the quantum wire in the core layer can be reduced.

Moreover, since the wavelength selection filter eliminates light generated by luminescent recombination, which is caused when carriers are annihilated in the quantum dot or the quantum wire, the influence of light generated by luminescent recombination can easily be blocked off.

DETAILED DESCRIPTION OF THE PREFERRED EMBODIMENTS

An embodiment of the invention is described by referring to the accompanying drawings.

Figure 1:
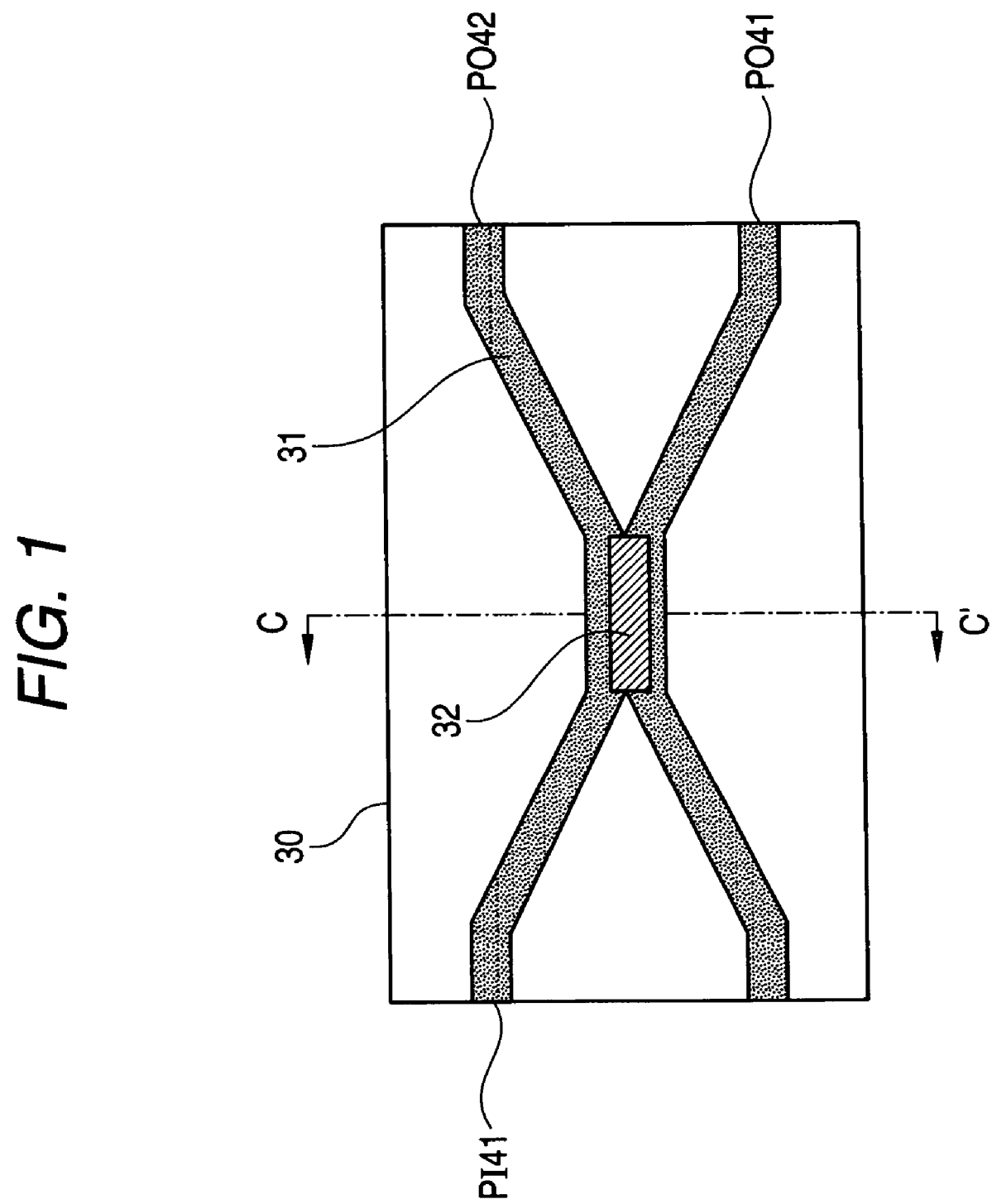
FIG. 1 is a plan view illustrating an embodiment of an optical switch according to the invention.

FIG. 1 is a plan view illustrating an embodiment of an optical switch according to the invention. Further, FIG. 2 is a cross-sectional view illustrating the embodiment of the optical switch according to the invention.

An "X-shaped" optical waveguide 31 is formed on a semiconductor substrate 30 shown in FIG. 1. An electrode 32 is formed at an intersecting portion (that is, a portion (referred to also as an optical switch portion) for branching an optical signal) of the "X-shaped" optical waveguide 31.

Figure 2:
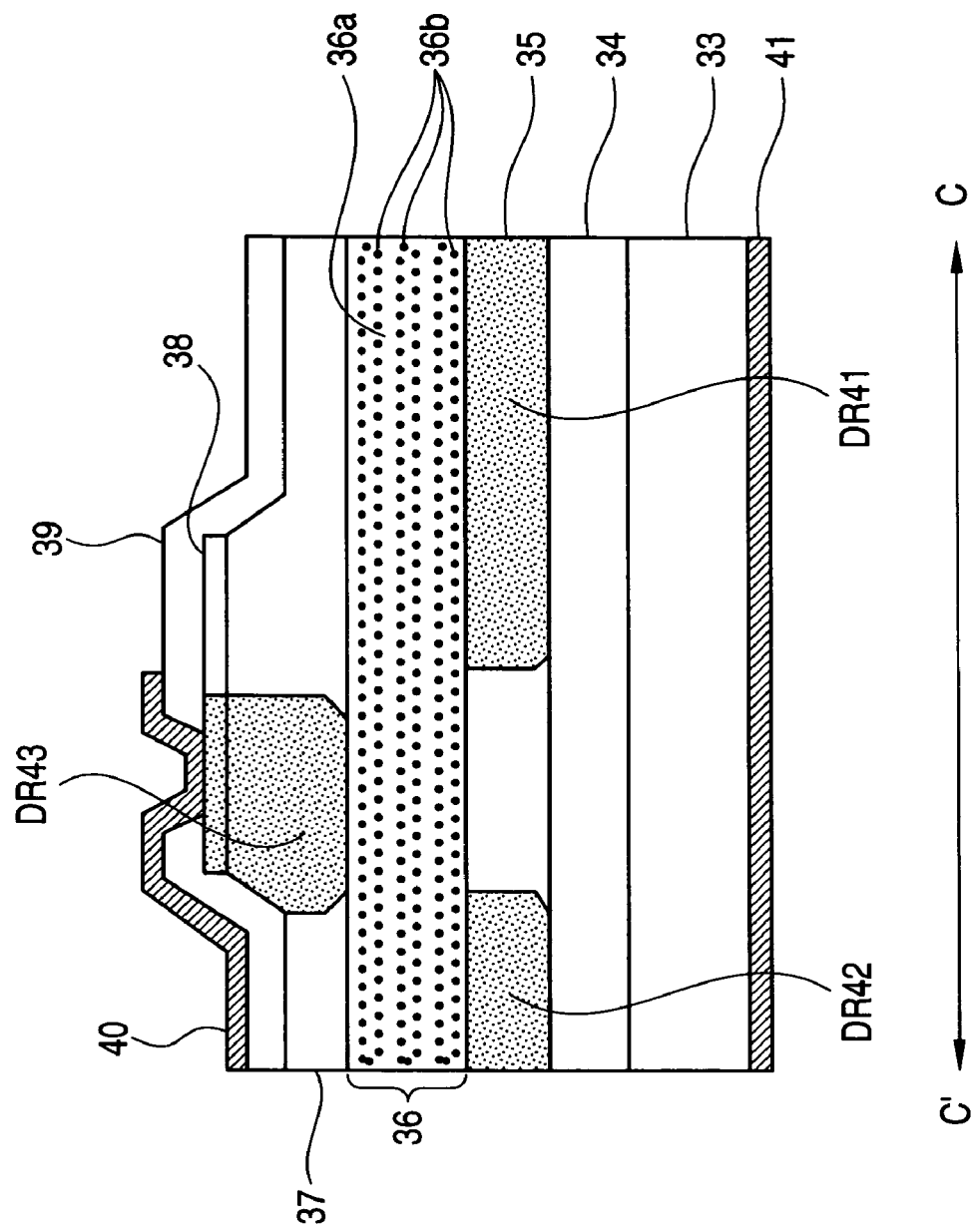
FIG. 2 is a cross-sectional view illustrating the embodiment of the optical switch according to the invention.
Figure 3:
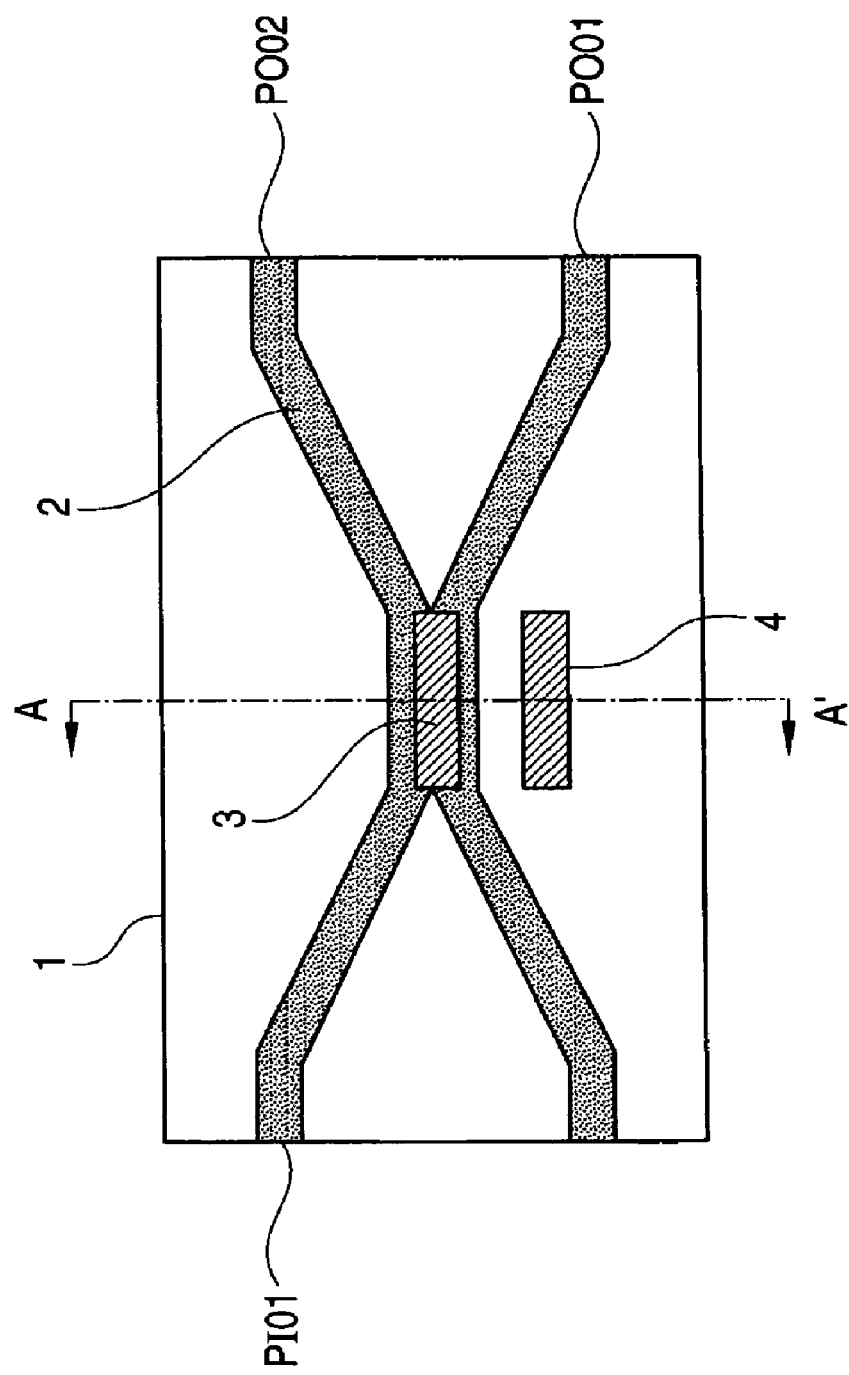
FIG. 3 is a plan view illustrating an example of a conventional optical switch.
Figure 4:
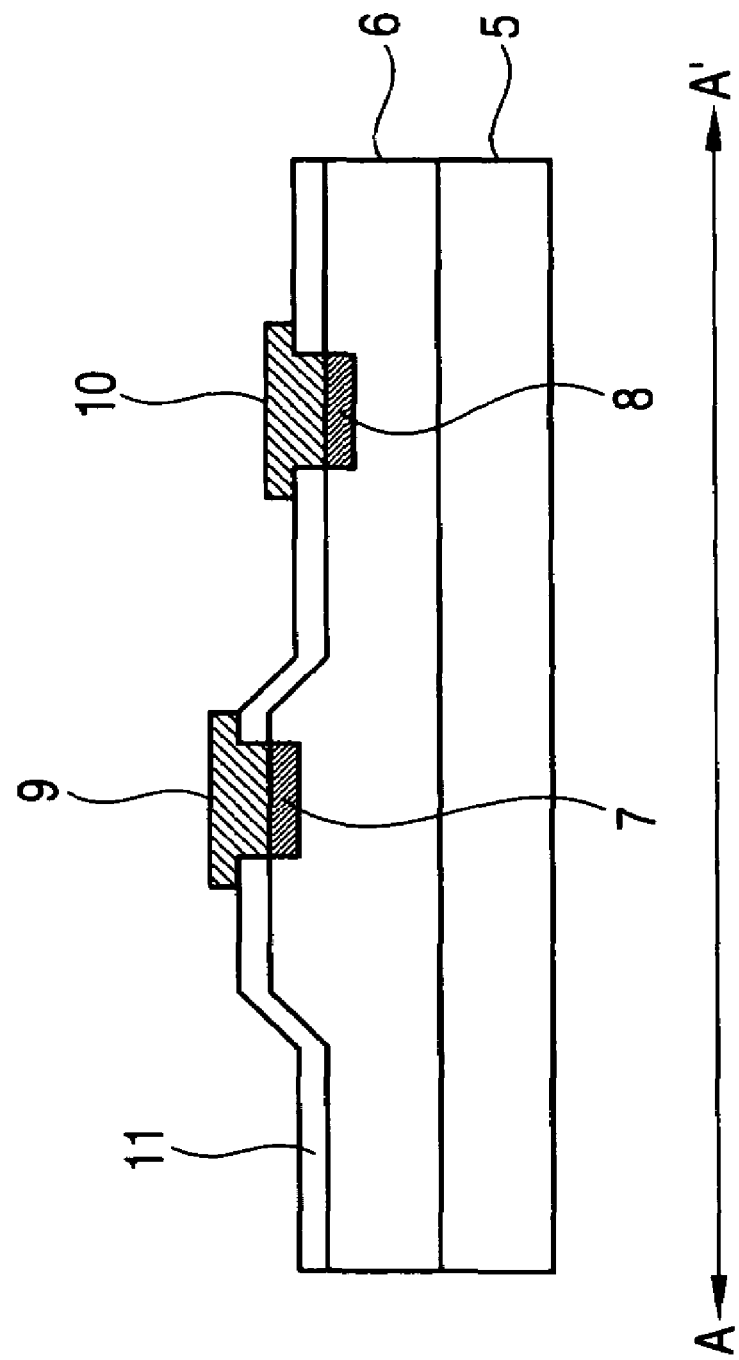
FIG. 4 is a cross-sectional view illustrating the example of the conventional optical switch.
Figure 5:
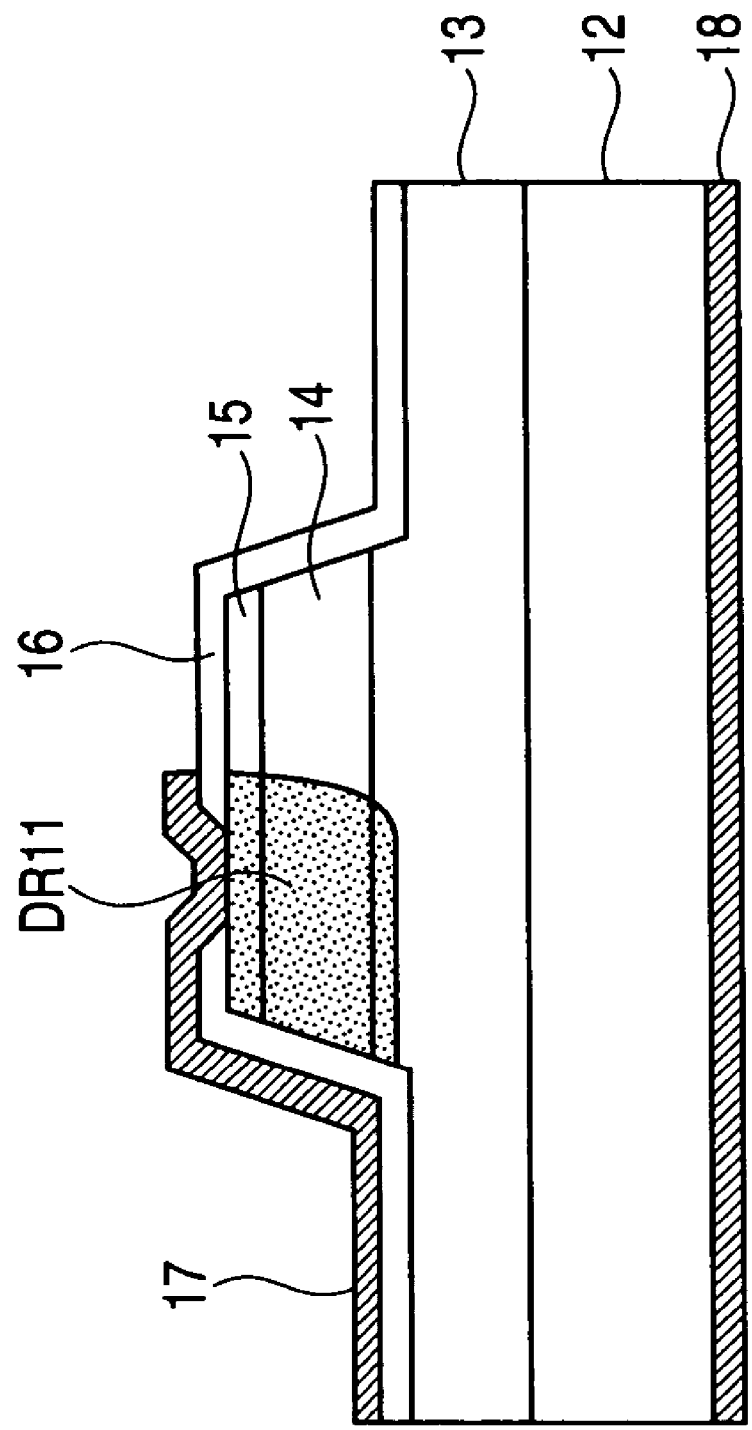
FIG. 5 is a cross-sectional view illustrating an example of a conventional optical switch using a material system, which is small in the effective mass of carriers.
Figure 6:
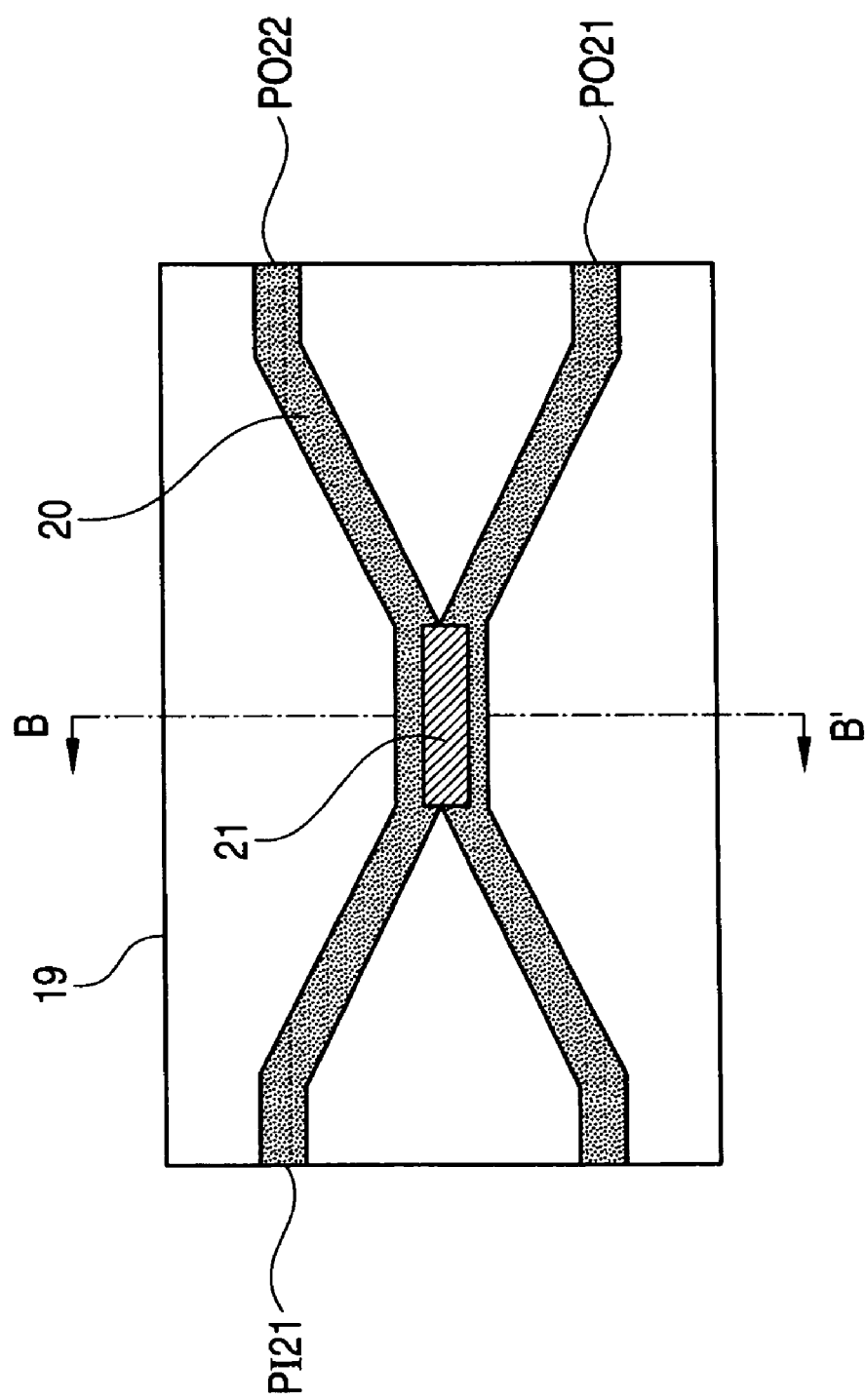
FIG. 6 is a plan view illustrating an example of a conventional optical switch restricting a refractive index change region by current confinement.
Figure 7:
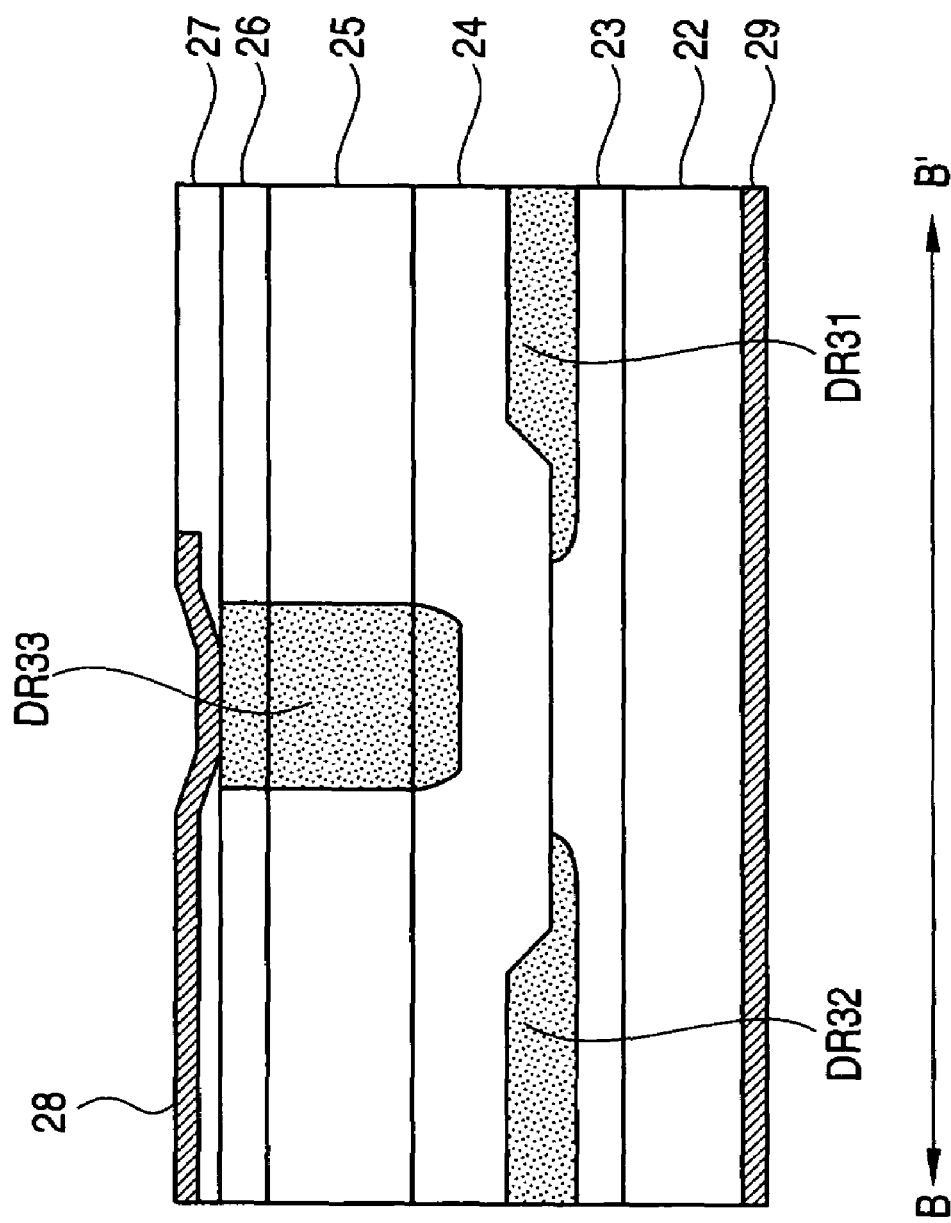
FIG. 7 is a cross-sectional view illustrating the example of the conventional optical switch restricting the refractive index change region by current confinement.

Meanwhile, FIG. 2 is a cross-sectional view taken along line "C–C'" shown in FIG. 1. A substrate 33 shown in FIG. 2 is made of InP or the like. An $n^+$-InP layer 34 is formed on the substrate 33. A lower clad layer 35 is an n-InP layer and formed on the InP layer 34.

A quantum dot structure is inserted into a core layer 36 that is formed on the lower clad layer 35. Specifically, for instance, InAs quantum dots 36b are inserted into an n-InGaAsP layer 36a of the core layer. Then, the quantum dots 36b having the size of about 2 to 10 [nm] which are manufactured by a self forming method and have small band gaps are held by the n-InGaAsP layer 36a having the thickness of about 100 to 200 [nm] which has high energy (large band gap). This operation is repeated a plurality of times so as to obtain a structure having the thickness necessary for the core layer 36 of the optical waveguide, for instance, 800 [nm].

An upper clad layer 37 is an n-InP layer and formed on the core layer 36. A contact layer 38 is an n-InGaAsP layer and formed on the upper clad layer 37. In portions designated by "DR41", "DR42" and "DR43" in FIG. 2, Zn, which is p-type impurity, is diffused.

An oxide film 39 is made of $SiO_2$ or the like and formed on a part of the contact layer 38, which is other than the diffusion region designated by "DR43" in FIG. 2. A p-electrode 40 is formed on the diffusion region designated by "DR43" in FIG. 2. An n-electrode 41 is formed on the back surface of the substrate 33.

A process of manufacturing such an optical switch is described hereinbelow.

The InP layer 34 and the lower clad layer 35 are crystallographically grown on the substrate 33. Further, Zn, which is p-type impurity, is selectively diffused in parts of the flat lower clad layer 35, which are other than the portion provided immediately under the p-electrode 40 (strictly speaking, a portion at which the contact layer 38 and the p-electrode 40 are in contact with each other), that is, portions designated by "DR41" and "DR42" in FIG. 2.

Thereafter, the core layer 36 (in which each of the n-InGaAs layers 36b is inserted into the associated n-InGaAsP layer 36a), the upper clad layer 37, and the contact layer 38 are serially formed on the lower clad layer 35, in which the impurity diffusion region is formed, in this order by crystal growth. Incidentally, conventional crystal growth methods (for example, a metalorganic vapor phase epitaxial growth method, and a molecular beam epitaxial growth method) can be applied to the crystal growth of these layers. For instance, crystals can be formed by self-forming InAs quantum dots.

Further, Zn, which is p-type impurity, is selectively diffused into the portions (that is, a part of the upper clad layer 37 and that of the contact layer 38) designated by "DR43" in FIG. 2. Subsequently, such layers are etched down to a midway portion of the upper clad layer 37. Thus, a slab optical waveguide is formed.

Furthermore, as shown in FIG. 2, the oxide film 39 formed on a part of the etched structure, which is other than the top part of the portion "DR43". A p-electrode 40 is formed in such a way as to be connected to a part of the contact layer 38, on which the oxide film 39 is not formed. An n-electrode 41 is formed on the back surface of the substrate 33.

An operation of such a device is described hereinbelow.

When the optical switch is in "OFF"-state, no currents are supplied to the electrode 32 (corresponding to the p-electrode 40 of FIG. 2) and to an n-electrode (not shown), which is provided on the back surface of the substrate 30 (and corresponds to the n-electrode 41 shown in FIG. 2).

Thus, the refractive index of the intersecting portion of the "X-shaped" optical waveguide 31 does not change. Therefore, for example, an optical signal having been incident from the portion designated by "PI41" in FIG. 1 goes straight in the intersecting portion and outputted from the portion designated by "PO41" shown in FIG. 1.

Conversely, when the optical switch is in "ON"-state, electric current is supplied to the electrode 32 and the n-electrode (not shown) provided on the back surface of the substrate 30, so that carriers (electrons and holes) are injected into the intersecting portion of the optical waveguide 31.

Concretely, electric current injected from the p-electrode 40 flows into the substrate 33 through the impurity diffusion region designated by "DR43" in FIG. 2, the core layer 36, the lower clad layer 35, and the impurity diffusion regions designated by "DR41" and "DR42" in FIG. 2.

That is, the current density of a region, which is a nearly widthwise half (or a part) of the intersecting portion of the optical waveguide 31, becomes high. The refractive index of this high-current-density region is changed owing to the plasma effect in such a way as to become low. Thus, for example, an optical signal having been incident from a portion designated by "PI41" in FIG. 1 is totally reflected by the boundary between a low refractive portion, which is produced in the intersecting portion of the "X-shaped" optical waveguide 30, and the remaining portion thereof and outputted from a portion designated by "PO42" in FIG. 1.

Subsequently, an operation after the electric current is completely injected (that is, an operation from "ON"-state to "OFF"-state by stopping the injection of a driving current) will be described below. Generally, the carrier in which the electric current is injected from the p-electrode 40 through a pn junction (a forward bias current) drifts and are annihilated within a range that is affected by an electric field by the pn junction when a forward bias voltage is stopped, or the carrier is diffused and annihilated within an area that is not affected by the electric field. In the annihilation process, recombination processes are involved, that include the direct recombination (it is also referred to as a luminescent recombination or a light emitting carrier recombination) of free electrons of a conduction band and free electron holes of a valence band, a recombination (a non-luminescent recombination) along with a thermal energy conversion (a transition including a phonon) or the like.

In the structure of the embodiment shown in FIG. 2, the free electrons and the free electron holes are restrained by the quantum dots 36b having the small band gaps and the carrier are annihilated due to the luminescent recombination determined by a quantum size effect. At this time, the lifetime of the light emission of the electron holes and electron pairs confined in a spatially narrow (0-dimensional well layer) area is extremely shortened (for instance, less than 1 [ns]) (For instance, see J. Bellessa, V. Volitis, R. Grousson, X. L. Wang, M. Ogura, and H. Matsuhata, "Quantum-size effects on radiative lifetimes and relaxation of excitons in semiconductor nanostructures", PHYSICAL REVIEW B, Vol. 58, No. 15, pp 9933–9940, (15 Oct. 1988), refer this document to as Document (6), hereinafter).

Consequently, the life of carriers, which are injected by the current injection after the application of the forward bias voltage is stopped, becomes very short, as compared with the case where there is no quantum well layer 36b. Therefore, when the "ON"-state of the optical switch is changed to the "OFF"-state, the optical response speed can be highly increased.

Incidentally, the wavelength of light generated by the luminescent recombination can be controlled by the size of the quantum dots 36b. Thus, for example, in a case where the optical switch is used for optical communication, preferably, the wavelength of light generated by the luminescent recombination is set at a value that is equal to or less than 1.4 μm, which is sufficiently shorter than the wavelength of a 1.5 μm band used for optical communication.

Further, a wavelength selection filter may be provided at each of the output ends PO41 and PO42 or of the subsequent-stages of the output ends PO41 and PO42. That is, it is preferable that only light of a wavelength of the band used for optical communication is passed therethrough, and that light generated by luminescent recombination is not passed therethrough. Thus, the wavelength selection filter allows light of necessary wavelengths to pass therethrough, and also eliminates light generated by luminescent recombination under the quantum dot structure, which is caused when carriers are annihilated. Consequently, the influence of light generated by luminescent recombination can easily be blocked off.

As described above, the quantum dot structure is inserted into the core layer 36. Thus, after the injection of drive currents is stopped, the life of carriers becomes very short. That is, the lifetime of the light emission of the electron holes and the electron pairs confined in the spatially narrow area is extremely shortened. Consequently, the life of carriers becomes very short. Thus, the optical response speed of the optical switch can be highly increased.

Furthermore, the optical switch is constructed only by inserting the quantum dot structure into the optical switch of the carrier-injection optical-wavelength type. Thus, the optical switch, whose optical response speed is highly increased, can easily be manufactured by using a conventional manufacturing process. Therefore, the practical value of this optical switch is very high.

Further, the wavelength of light generated by luminescent recombination can be controlled by the size of the quantum well layer 36b. For instance, the wavelength of light generated by luminescent recombination, which is caused when carriers are annihilated in the quantum dot structure, can be set to a luminescence wavelength that differs from wavelengths used for optical communication. Additionally, the increase in amount of optical absorption caused by inserting the quantum dot or the quantum wire in the core layer 36 can be reduced.

Incidentally, the invention is not limited to this embodiment. The following modifications may be made.

The invention may be applied to an optical switch of the carrier injection type enabled so that a quantum well structure is inserted to the core layer 36. For instance, the invention may be applied to optical switches of the aforementioned conventional configurations.

Further, in the above-described structure, the quantum dots 36b of the zero-dimensional well layer are inserted into the core layer 36. However, the quantum wire may be inserted into a one-dimensional well layer. Namely, the lifetime of the light emission of the electron holes and the electron pairs confined in a spatially narrow area (the one-dimensional well layer) is extremely shortened (for instance, see the above-described Non-Patent Document 6). Thus, the lifetime of the carrier is very shortened and the optical response speed of the optical switch can be increased.

Further, as the quantum dot structure, the structure that the InAs quantum dots 36b are inserted into the n-InGaAsP layer 36a. However, other materials or compositions may be employed. It is to be understood that other materials or compositions may be employed for the substrate or the clad layers.

Further, although the foregoing description has described the configuration in which the quantum dot structure is inserted into the core layer 36, the quantum dot structure may be inserted into a layer through which an optical signal is propagated. That is, propagation light propagated through the optical waveguide 31 leaks out not only to the core layer 36 but to the clad layer, whose refractive index is lower than that of this core layer 36. Consequently, the quantum dot structure may be inserted into optical waveguide layers (including the core layer and the upper and lower clad layers to one or both of which light leaks out) serving as a region, in which propagation light is confined when light propagates through this layer serving as the optical waveguide 31. It is to be understood that the quantum wire may be inserted into the optical waveguide layer in place of the quantum dots.

Thus, because the quantum dot (or the quantum wire) is inserted into the optical waveguide layer, the life of carriers of the region, which is affected by the refractive index change, can be reduced according to the carrier density change. Consequently, the influence of light, which leaks out to the clad layer, on the optical response can be alleviated. Therefore, the optical response speed of the optical switch can be highly increased.

The foregoing description has described the example of the "X-shaped" optical waveguide 31 formed on the substrate 30. However, needless to say, as long as the optical waveguide has two sub-waveguides for outputting optical signals, the optical waveguide may be "y-shaped" and may have any other shape. Incidentally, the "y-shaped" optical waveguide 31 has a shape in which sub-waveguides branch off at different angles from a part of a single straight sub-waveguide.

Further, the foregoing description has described the configuration in which the impurity diffusion region "DR43" is provided in a left-half of the intersecting portion of the optical waveguide 31. However, the impurity diffusion region "DR43" may be provided at a central part thereof.

Furthermore, the foregoing description has described the example in which the n$^+$-InP layer 34 is formed on the substrate 33. However, the n$^+$-InP layer 34 is not indispensable constituent of the invention. Thus, the n$^+$-InP layer 34 may be omitted.

What is claimed is:

1. An optical switch, comprising:
    an optical waveguide whose output path of an optical signal branches into two;
    a carrier injection section which is provided to a branch portion of the optical waveguide and to which carriers are injected; and
    a refractive index change section which is provided in an optical waveguide layer of the optical waveguide and in which a refractive index changes when carriers are injected to the carrier injection section,
    wherein the refractive index change section has quantum dots or a quantum wire, the optical waveguide layer is a region where light propagating through the optical waveguide is confined and includes a core layer, and the quantum dots or the quantum wire are provided in the core layer.

2. The optical switch according to claim 1,
    wherein the optical waveguide is a slab optical waveguide.

3. The optical switch according to claim 1,
    further including a wavelength selection filter which eliminates light generated by luminescent recombination, which is caused when carrier are annihilated in the quantum dot or the quantum wire.

4. The optical switch according to claim 1,
    wherein the optical waveguide has a shape that two straight optical waveguides intersect with each other.

5. The optical switch according to claim 1,
    wherein the optical waveguide has a shape that one straight optical waveguide branches off at different angles.

6. The optical switch according to claim 1, wherein the optical switch includes a quantum well layer, and a size of the quantum well layer is selected to control the wavelength of light generated by luminescent recombination.

7. The optical switch according to claim 6, wherein a wavelength of light generated by luminescent recombination is set to a luminescence wavelength that differs from a wavelength used for optical communication.

* * * * *